United States Patent
Hill et al.

(10) Patent No.: US 8,487,910 B2
(45) Date of Patent: Jul. 16, 2013

(54) LARGE SCALE TOUCH SYSTEM AND METHODS FOR INTERACTING WITH SAME

(75) Inventors: Douglas Hill, Calgary (CA); Niel Beckie, Calgary (CA); Taco van Ieperen, Calgary (CA); Serguei Vdovine, Calgary (CA); Roberto Sirotich, Calgary (CA); Mark Fletcher, Ottawa (CA); Scott Tallman, Calgary (CA); Marilyn Williams, Calgary (CA); Shane Edward Bill, Calgary (CA); Shannon Patricia Goodman, Calgary (CA)

(73) Assignee: SMART Technologies ULC (CA)

( * ) Notice: Subject to any disclaimer, the term of this patent is extended or adjusted under 35 U.S.C. 154(b) by 494 days.

(21) Appl. No.: 11/118,626

(22) Filed: May 2, 2005

(65) Prior Publication Data

US 2006/0244734 A1 Nov. 2, 2006

(51) Int. Cl.
*G06F 3/042* (2006.01)

(52) U.S. Cl.
USPC .......................................................... 345/175

(58) Field of Classification Search
USPC .............. 345/173, 175, 179–183; 178/18.01, 178/18.09, 18.11, 19.04, 19.05
See application file for complete search history.

(56) References Cited

U.S. PATENT DOCUMENTS

| | | | | | |
|---|---|---|---|---|---|
| 4,746,770 | A | * | 5/1988 | McAvinney | 178/18.09 |
| 5,455,906 | A | * | 10/1995 | Usuda | 345/536 |
| 5,485,174 | A | * | 1/1996 | Henshaw et al. | 345/684 |
| 5,528,263 | A | * | 6/1996 | Platzker et al. | 345/156 |
| 5,568,604 | A | * | 10/1996 | Hansen | 715/863 |
| 5,583,543 | A | * | 12/1996 | Takahashi et al. | 345/173 |
| 5,677,710 | A | * | 10/1997 | Thompson-Rohrlich | 345/173 |
| 5,818,975 | A | * | 10/1998 | Goodwin et al. | 382/274 |
| 5,831,602 | A | * | 11/1998 | Sato et al. | 345/175 |
| 5,982,302 | A | * | 11/1999 | Ure | 341/22 |
| 6,064,354 | A | * | 5/2000 | DeLuca | 345/7 |
| 6,232,962 | B1 | * | 5/2001 | Davis et al. | 345/177 |
| 6,278,443 | B1 | * | 8/2001 | Amro et al. | 345/173 |
| 6,374,272 | B2 | * | 4/2002 | Bates et al. | 345/156 |
| 6,421,042 | B1 | | 7/2002 | Omura et al. | |

(Continued)

FOREIGN PATENT DOCUMENTS

| | | | |
|---|---|---|---|
| EP | 0725331 | * | 7/1996 |
| JP | 2000-132340 A | | 5/2000 |

(Continued)

OTHER PUBLICATIONS

Sivakumar, A modal dialog that fades the background to gray-scale imitating the XP shutdown screen, Feb. 23, 2006, http://www.codeproject.com/KB/dotnet/DimmerForm.aspx.*

(Continued)

*Primary Examiner* — Chanh Nguyen
*Assistant Examiner* — Robert Stone
(74) *Attorney, Agent, or Firm* — Katten Muchin Rosenman LLP (57) ABSTRACT

A touch system comprises a large scale touch surface on which an image is presented and at least two imaging devices looking across the touch surface and having overlapping fields of view. Processing structure communicates with the imaging devices and processes image data acquired by the imaging devices to determine pointer contacts on the touch surface using triangulation. The processing structure further executes at least one application to facilitate user interaction with the touch surface. Methods of interacting with the touch surface are also disclosed.

19 Claims, 10 Drawing Sheets

U.S. PATENT DOCUMENTS

| | | | |
|---|---|---|---|
| 6,518,983 B1* | 2/2003 | Grohmann et al. | 715/781 |
| 6,670,950 B1* | 12/2003 | Chin et al. | 345/173 |
| 6,747,636 B2* | 6/2004 | Martin | 345/178 |
| 6,831,646 B1* | 12/2004 | Cottrille | 345/473 |
| 6,992,702 B1 | 1/2006 | Foote et al. | |
| 7,081,887 B2* | 7/2006 | Harrison | 345/173 |
| 7,292,206 B2* | 11/2007 | Numano | 345/1.1 |
| 2002/0008692 A1* | 1/2002 | Omura et al. | 345/173 |
| 2002/0075243 A1* | 6/2002 | Newton | 345/173 |
| 2002/0093666 A1* | 7/2002 | Foote et al. | 356/621 |
| 2002/0135536 A1* | 9/2002 | Bruning | 345/1.1 |
| 2002/0145595 A1* | 10/2002 | Satoh | 345/173 |
| 2002/0163530 A1* | 11/2002 | Takakura et al. | 345/629 |
| 2003/0038788 A1* | 2/2003 | Demartines et al. | 345/173 |
| 2003/0052866 A1* | 3/2003 | Sakaguchi | 345/173 |
| 2003/0071832 A1* | 4/2003 | Branson | 345/698 |
| 2003/0071858 A1 | 4/2003 | Morohoshi | |
| 2003/0193481 A1* | 10/2003 | Sokolsky | 345/173 |
| 2004/0021647 A1* | 2/2004 | Iwema et al. | 345/179 |
| 2004/0141015 A1* | 7/2004 | Fitzmaurice et al. | 345/856 |
| 2004/0178993 A1* | 9/2004 | Morrison et al. | 345/173 |
| 2004/0196267 A1* | 10/2004 | Kawai et al. | 345/173 |
| 2004/0201698 A1* | 10/2004 | Keenan et al. | 348/207.99 |
| 2005/0057524 A1* | 3/2005 | Hill et al. | 345/173 |
| 2005/0114785 A1* | 5/2005 | Finnigan et al. | 715/762 |
| 2005/0156900 A1* | 7/2005 | Hill et al. | 345/173 |
| 2006/0015818 A1* | 1/2006 | Chaudhri et al. | 715/779 |

FOREIGN PATENT DOCUMENTS

| | | |
|---|---|---|
| JP | 2001-128057 A | 5/2001 |
| JP | 2003-173237 A | 6/2003 |
| WO | 2004/109496 A2 | 12/2004 |

OTHER PUBLICATIONS

Schwartz, Shutdown (Windows XP Style), Dec. 4, 2002, http://classic.pocketgear.com/software_detail.asp?id=6666.*

Desney S Tan, Brian Meyers, Mary Czerwinski. WinCuts: Manipulating Arbitrary Window Regions for More Effective Use of Screen Space. (Apr. 2004) Extended Abstracts at CHI 2004 Conference on Human Factors in Computing Systems, pp. 1525-1528.

AnastasiaBezerianos and Ravin Balakrishnan. View and Space Management on Large Displays. (Jul. 2005) IEEE Computer graphics and Applications, pp. 34-43.

International Search Report for International Application No. PCT/CA2006/000706.

Written Opinion of the International Searching Authority for International Application No. PCT/CA2006/00706.

English translation of the Decision of Rejection for Japanese Patent Application No. 2008-509280 with a mailing date of Mar. 21, 2012.

English translation of the Notice of Reasons for Rejection for Japanese Patent Application No. 2008-509280 with a mailing date of Aug. 10, 2011.

* cited by examiner

LARGE SCALE TOUCH SYSTEM AND METHODS FOR INTERACTING WITH SAME

FIELD OF THE INVENTION

The present invention relates generally to interactive input systems and in particular, to a large scale touch system and methods of interacting with the same.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the touch surface where the contacts are made. Common touch systems utilize analog resistive, electromagnetic, capacitive, acoustic or machine vision to identify pointer interactions with the touch surface.

For example, International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-coordinates relative to the touch surface using triangulation. The pointer coordinate data is conveyed to a computer executing one or more applications programs. The computer uses the pointer coordinate data to update the computer-generated image that is presented on the touch surface. Pointer contacts on the touch surface can therefore be recorded as writing or drawing or used to control execution of applications programs executed by the computer.

Although the above touch system works extremely well, since the field of view of each camera is arranged to encompass the entire touch surface, camera resolution has placed a limit on the size of the touch system that can be made.

In many environments such as in teaching institutions, large scale touch systems are desired so that visible presentations can be made to large groups. A large scale touch system created from a series of side-by-side mounted touch panels has been considered. Although this touch system provides a larger touch surface, the touch surface is not continuous due to the individual frames surrounding the touch surfaces. Also, tracking pointer movements from one touch surface to another is cumbersome and user unfriendly.

A large scale touch system that overcomes the above-noted problems is disclosed in U.S. patent application Ser. No. 10/750,219 to Hill et al. and assigned to SMART Technologies Inc., assignee of the present invention. This large scale touch system includes a touch surface divided into a plurality of coordinate input sub-regions. The input sub-regions overlap to define a generally contiguous input surface. Each coordinate input sub-region generates pointer coordinate data in response to pointer contacts thereon. The pointer coordinate data is processed to update image data presented on the input surface. When a pointer contact is made on a coordinate input sub-region that does not overlap with an adjacent coordinate input sub-region, the coordinate input sub-region processes acquired images to derive pointer data and triangulates the position of the pointer using the derived pointer data thereby to determine the position of the pointer contact relative to the touch surface. When a pointer contact is made on a coordinate input sub-region that overlaps with an adjacent coordinate input sub-region, each overlapping coordinate input sub-regions processes acquired images to derive pointer data and triangulates the position of the pointer using the derived pointer data. Thereafter, the triangulated positions generated by the overlapping coordinate input sub-regions are processed in accordance with defined logic thereby to determine the position of the pointer contact relative to the touch surface.

The above-noted Hill et al. large scale touch system provides a contiguous touch surface making it extremely useful in environments where the touch surface is to be viewed by larger groups. Increasing the size of the touch surface however presents challenges. Various situations can arise where a user cannot readily physically interact with the touch surface. For example, depending on the size of the touch surface and the physical size and/or condition of the user, the user may not be able to reach upper regions of the touch surface. Also, situations may arise where the user is standing to one side of the touch surface but needs to interact with image content displayed adjacent the opposite side of the touch surface. Having to walk to the opposite side of the touch surface to interact with the touch surface is inconvenient and may result in the image presented on the touch surface being disrupted or obscured. Furthermore, the size of the touch surface can make it difficult for a user to identify visually displayed objects such as modal boxes. As will be appreciated, methods of interacting with such large scale touch systems to facilitate user interaction are desired.

It is therefore an object of the present invention to provide a novel large scale touch system and methods of interacting with the same.

SUMMARY OF THE INVENTION

Accordingly, in one aspect there is provided in a large scale touch system having a touch surface on which a displayed image is presented, a method of facilitating user interaction with said displayed image comprising:

displaying a scaled version of at least a portion of said displayed image on said touch surface at a user accessible location; and mapping the scaled version to the corresponding portion of said displayed image so that user interactions with the scaled version are translated to interactions with said displayed image.

In one embodiment, during the displaying a scaled version of the entire displayed image is presented within a window. The window is positioned adjacent a lower portion of the touch surface. The position of the window is user adjustable.

According to another aspect there is provided in a large scale touch system having a touch surface on which a displayed image is presented, a method of facilitating user interaction with said displayed image comprising:

defining a text input region on said touch surface adjacent a user accessible location;

detecting text input into said text input region; and displaying the detected input text in a text display region spaced from said text input region.

In one embodiment, the text display region is positioned adjacent the upper portion of the touch surface and the text input region is positioned adjacent a lower portion of the touch surface. The position of both the text input region and text display region are user adjustable.

According to yet another aspect there is provided in a large scale touch system having a touch surface, a method of positioning displayed objects presented on said touch surface comprising:

tracking movement of a user relative to said touch surface; and positioning one or more displayed objects proximate said user.

In one embodiment, the position of the user is tracked by monitoring the position of the last touch input. Displayed objects are presented proximate to the position of the last touch input.

In an alternative embodiment, the tracking comprises capturing images of a region surrounding the touch surface and processing the captured images to determine the position of the user relative to the touch surface. Shadows cast on the touch surface can also be detected so that displayed objects are presented on the touch surface adjacent the user and outside of detected shadows.

According to still yet another aspect there is provided in a large scale touch system having a touch surface on which a displayed image is presented, a method of facilitating user interaction with said displayed image comprising:

highlighting at least one displayed object which requires user interaction to provide strong visual feedback concerning the existence of said at least one displayed object.

In one embodiment, the at least one displayed object is a modal box and the highlighting comprises applying an overlay to the displayed image. The overlay has an opening therein sized to correspond generally with the modal box and being colored to contrast sharply with the modal box thereby to highlight the modal box. In an alternative embodiment, the highlighting comprises displaying concentric rings about the modal box.

According to still yet another aspect there is provided in a large scale touch system having a touch surface on which a displayed image is presented, a method of facilitating user interaction with said displayed image comprising:

reproducing at least one region of said displayed image on said touch surface at a user accessible location; and mapping the reproduced region to the corresponding portion of said displayed image so that user interactions with the reproduced region are translated to interactions with the corresponding portion of said displayed image.

In one embodiment, the at least one region is the upper region of the displayed image. The upper region of the displayed image is reproduced adjacent the bottom portion of the displayed image. The opposite side portions of the displayed image are also reproduced adjacent each side of the touch surface.

According to still yet another aspect there is provided in a large scale touch system having a touch surface on which a displayed image is presented, a method of facilitating user interaction with said displayed image comprising:

displaying a mouse object on said touch surface;

detecting pointer interactions on said touch surface within said mouse object; and processing mouse events corresponding to said pointer interactions in a manner to avoid input focus being shifted to said mouse object.

During processing, mouse events are injected into the mouse event queue of the touch system operating system. The mouse object may include one or more buttons. In one embodiment, the mouse object is stationary and resembles a mouse pad. In another embodiment, the mouse object is movable across the touch surface in response to pointer interactions with the touch surface.

According to still yet another aspect there is provided in a touch system comprising:

a large scale touch surface on which an image is presented;

at least two imaging devices looking across said touch surface and having overlapping fields of view; and processing structure communicating with said imaging devices and processing image data acquired by said imaging devices to determine pointer contacts on said touch surface using triangulation, said processing structure further executing at least one application to facilitate user interaction with said touch surface.

The interaction methods provide advantages in that a user is able to interact with the entire display area of the touch surface notwithstanding the fact that much of the touch surface may be beyond the physical reach of the user. The interaction methods also facilitate user interaction by avoiding the need for the user to move to inconvenient locations to interact with the touch surface and ensure that displayed objects requiring immediate attention by the user are clearly visible on the touch surface.

BRIEF DESCRIPTION OF THE DRAWINGS

Embodiments will now be described more fully with reference to the accompanying drawings in which.

DETAILED DESCRIPTION OF THE EMBODIMENTS

Figure 1:
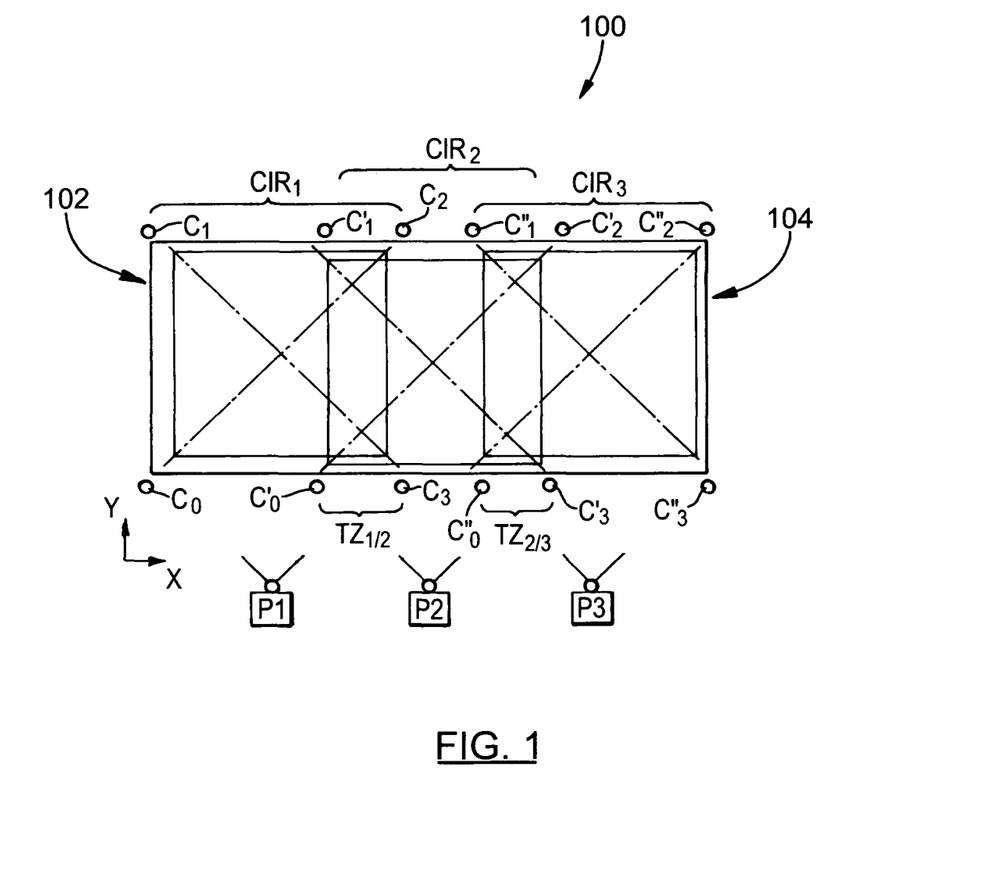
FIG. 1 is a front plan view of a large scale touch system including an elongate rectangular, generally contiguous touch surface divided into a series of coordinate input subregions.
Figure 2:
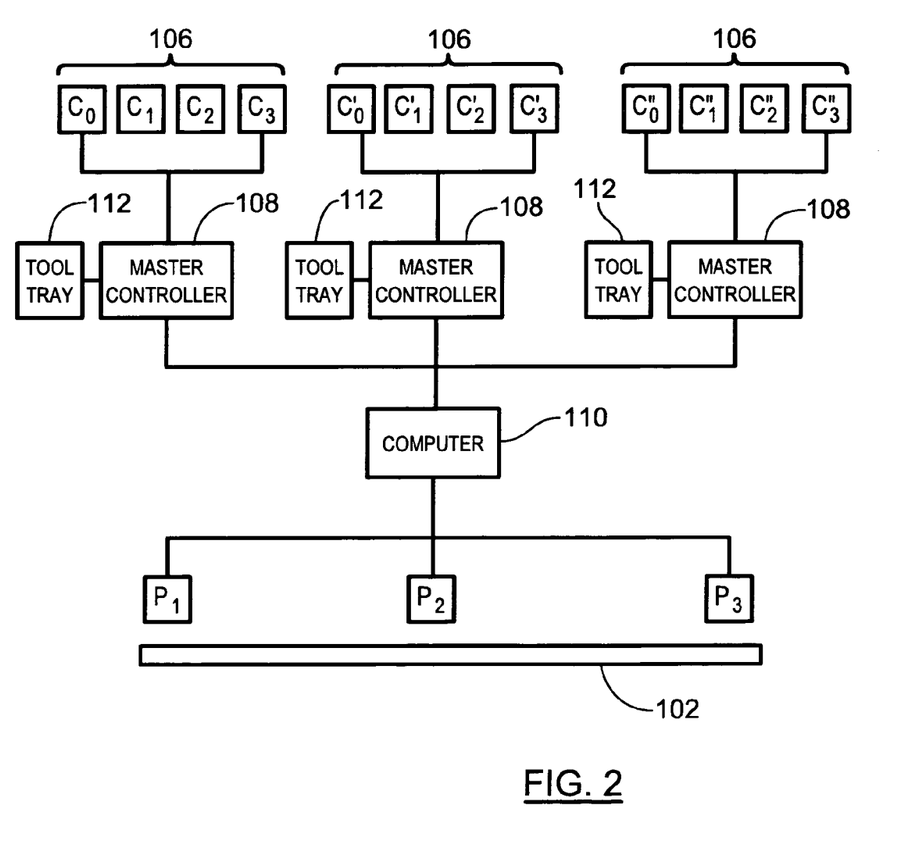
FIG. 2 is a schematic block diagram of the touch system of FIG. 1.
Figure 3:
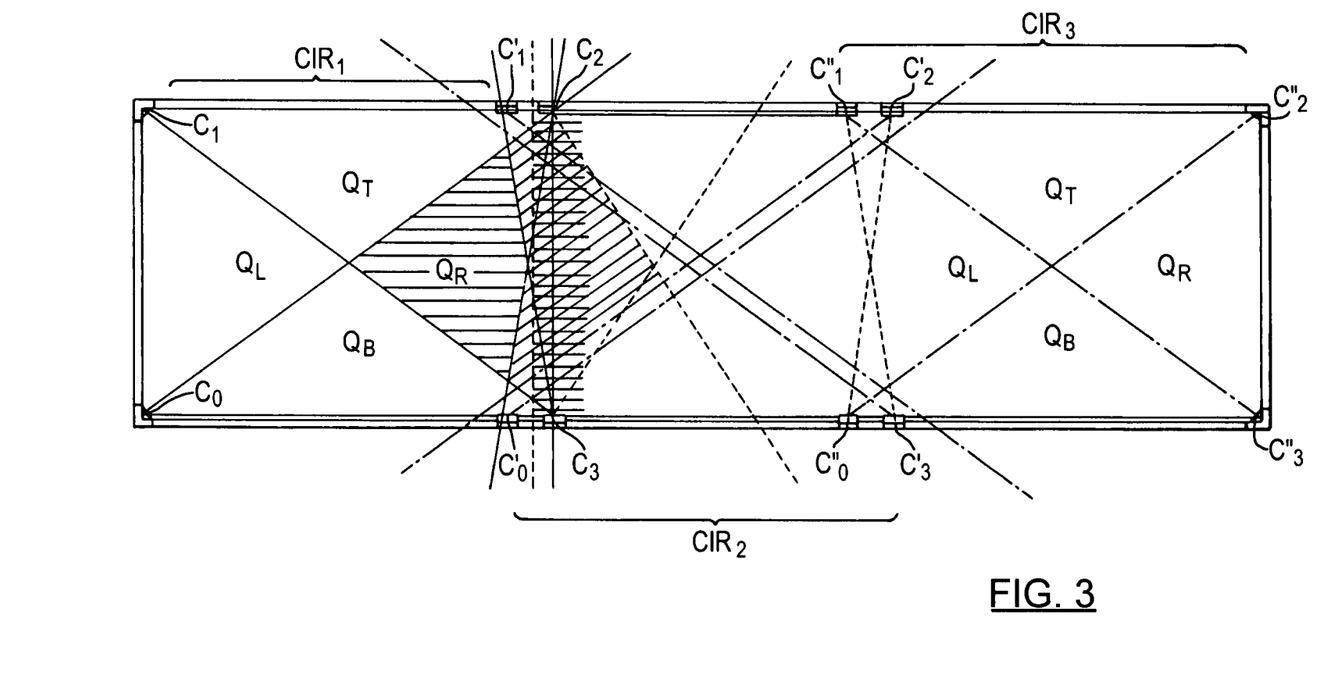
FIG. 3 is another front plan view of the large scale touch system of FIG. 1.

Turning now to FIGS. 1 and 2, a large scale interactive touch system of the type described in U.S. patent application Ser. No. 10/750,219 to Hill et al. filed on Jan. 2, 2004, assigned to SMART Technologies, Inc., assignee of the present invention, the content of which is incorporated herein by reference, is shown and is generally identified by reference numeral 100. Touch system 100 includes an elongate generally rectangular and contiguous touch surface 102 surrounded by an illuminated bezel 104. Illuminated bezel 104 provides infrared backlighting across the touch surface 102.

A plurality of sets 106 of cameras, in this example three sets 106 of cameras, is associated with the touch surface 102. The sets 106 of cameras are positioned along the length of the touch surface 102. Each set 106 of cameras includes four cameras arranged to define the corners of a rectangle. The cameras of each set 106 have overlapping fields of view oriented to look across a portion of the touch surface 102 thereby to define a touch or coordinate input sub-region. Thus, in the present embodiment, the sets 106 of cameras define a series of three side-by-side coordinate input sub-regions $CIR_1$, $CIR_2$ and $CIR_3$ respectively. The fields of view of the cameras are also oriented so that the coordinate input sub-regions defined by adjacent sets of cameras overlap to define two transition zones $TZ_{1/2}$ and $TZ_{2/3}$ respectively.

Each set 106 of cameras communicates with a master controller 108. Each master controller 108 processes pointer characteristic data received from its associated set 106 of cameras to determine the positions of pointers appearing in images captured by the cameras in (x,y)-coordinates using triangulation. The master controllers 108 transmit the pointer coordinate data to a computer 110 allowing the computer 110 either to record the pointer coordinate data as writing or drawing or use the pointer coordinate data as a mouse event to control execution of an applications program executed by the computer 110. The computer 110 provides image data to a series of projectors $P_1$ to $P_3$, which in turn project images onto the touch surface 102. The image data is updated by the computer 110 in response to received pointer coordinate data so that the images projected onto the touch surface 102 reflect the pointer activity.

Each projector is associated with a different coordinate input sub-region and projects an image thereon. As can be seen, projector $P_1$ projects an image $I_1$ onto coordinate input sub-region $CIR_1$, projector $P_2$ projects an image $I_2$ onto coordinate input sub-region $CIR_2$ and projector $P_3$ projects an image $I_3$ onto coordinate input sub-region $CIR_3$. The projected images $I_1$, $I_2$ and $I_3$ are aligned and joined seamlessly along vertical lines generally at the mid-points of the transition zones $TZ_{1/2}$ and $TZ_{2/3}$ to provide a smooth and continuous image spanning the touch surface 102. In the present embodiment, the computer 110 executes a desktop application. Each coordinate input sub-region is associated with and tied to a specific section of the desktop. As a result, the computer 110 provides image data to the projectors $P_1$ to $P_3$ so that the appropriate desktop sections are displayed on the coordinate input sub-regions.

A tool tray 112 is also associated with each coordinate input sub-region. Each tool tray 112 holds a number of pointers or tools (not shown) having different assigned attributes. In this case, each tool tray holds a number of colored pens as well as an eraser. When a tool is lifted from the tool tray, the tool tray 112 provides a signal to the associated master controller 108 which in turn conveys the signal to the computer 110 to identify the selected tool. In this manner, when a colored pen is used to contact the touch surface 102, writing in the appropriate color tracking the pen movement is projected onto the touch surface. When an eraser is used to contact the touch surface 102 writing projected onto the touch surface over which the eraser is moved is erased. As is known, the desktop application can be conditioned to assign properties to pointers used to contact each coordinate input sub-region.

Each coordinate input sub-region is divided into four quadrants using diagonal lines extending between the cameras at opposite corners of the coordinate input sub-region. Image capture to permit pointer tracking within each quadrant is the responsibility of a different pair of cameras in the set. The top quadrant $Q_T$ is the responsibility of the bottom left and bottom right cameras in the set, the bottom quadrant $Q_B$ is the responsibility of the top left and top right cameras in the set, the left quadrant $Q_L$ is the responsibility of the top left and bottom left cameras in the set and the right quadrant $Q_R$ is the responsibility of the top right and bottom right cameras in the set.

When a pointer contacts a quadrant within one of the coordinate input sub-regions outside of a transition zone, the images captured by the pair of cameras assigned to that quadrant are processed by the cameras and the associated master controller 108 in the manner described in U.S. patent application Ser. No. 10/294,917 to Morrison et al., assigned to SMART Technologies Inc., assignee of the present invention, the content of which is incorporated by reference. In this manner, a bounding box surrounding the pointer contact is determined allowing the location of the pointer in (x,y)-coordinates with respect to the coordinate input sub-region to be calculated. Thus, in this case only one master controller 108 reports pointer coordinate data to the computer 110. The computer 110 in turn records the pointer coordinate data as writing or drawing if the pointer contact is a write event or injects the pointer coordinate data into the active applications program being run by the computer 110 if the pointer contact is a mouse event.

In general to determine if a pointer contact is a write or mouse event, the tool type and point of first contact is examined. If a drawing tool is used to make the contact and the contact is within a designated writing area within the projected desktop section, the pointer contact is treated as a write event; otherwise the pointer contact is treated as a mouse event.

When a pointer contacts the touch surface 102 within a transition zone, the master controllers 108 associated with the two sets of cameras that observe the transition zone generate pointer coordinates in the same manner referenced above and convey the generated pointer coordinates to the computer 110. Upon receipt of the two reported pointer coordinates, the computer 110 uses defined logic, in this case a weighted averaging technique, to yield a single (x,y)-coordinate pair representing the position of the pointer contact. The computer 110 in turn records the pointer coordinate data as writing or drawing if the pointer contact is a write event or injects the pointer coordinate data into the active applications program being run by the computer 110 if the pointer contact is a mouse event.

When a user interacts with the touch surface, due to the size of the touch surface, displayed objects with which the user needs to interact may be beyond the reach of the user requiring the user to move across the front of the touch surface to a location near the displayed objects. This of course can be problematic as the projected images can be interrupted and/or the view of the touch surface obscured. Displayed objects may also be difficult to see due to the size of the touch surface 102.

To overcome this problem, a number of different interaction methods can be invoked to facilitate user interaction with the large scale touch surface 102. The interaction methods supported by the large scale touch system 102 will now be described.

Scaled Desktop

As mentioned above, in many instances portions of the displayed image with which the user must interact are beyond-the reach of the user. To deal with this problem, a scaled desktop application stored on the computer 110 can be invoked in response to an associated input gesture. For example, the input gesture may require the user to touch the touch surface 102 with two fingers close together and then move the fingers apart generally horizontally in opposite directions. Alternatively, the input gesture may require the user to touch the touch surface 102 with a finger and then move the finger back and forth generally horizontally within a short time frame.

Figure 4:
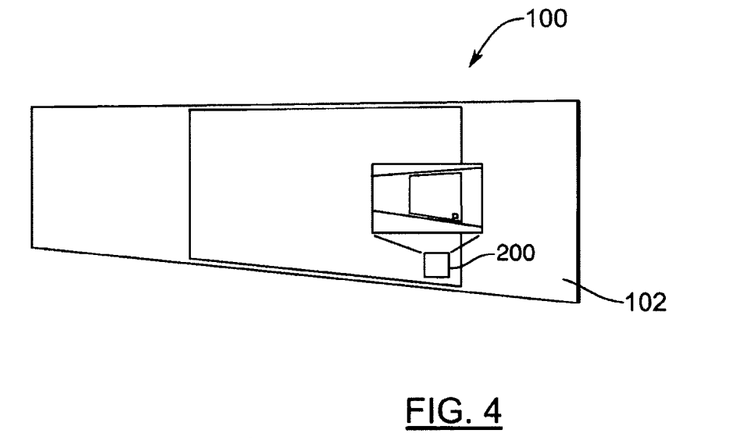
FIG. 4 is a front plan view of the large scale touch system of FIG. 1 showing a scaled desktop window displayed during execution of a scaled desktop application.
Figure 5A:
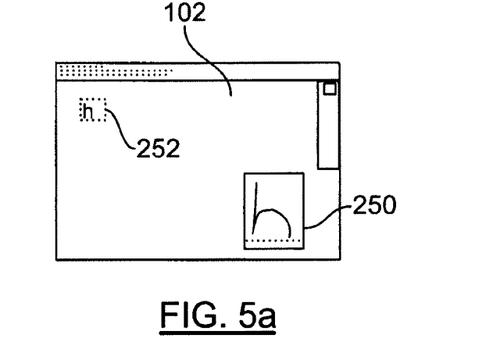
FIGS. 5a to 5e are front plan views of a portion of the touch surface showing a text input window and an upper text display region displayed during execution of a text input application.
Figure 5B:
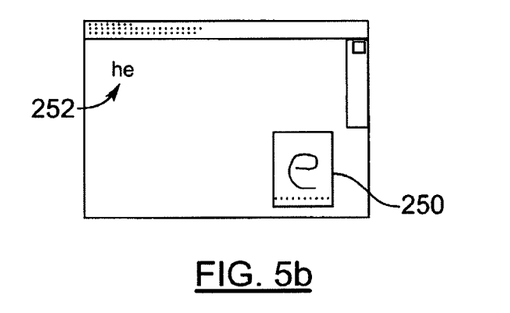
Figure 5C:
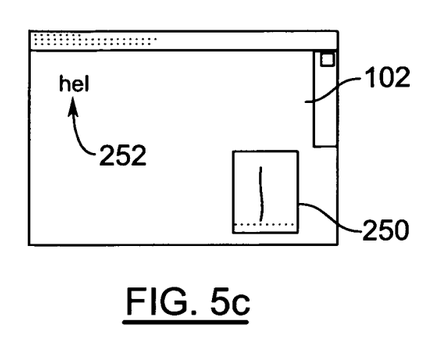
Figure 5D:
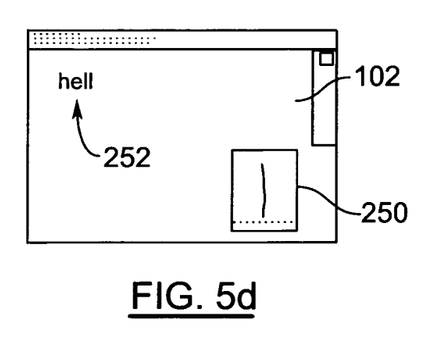
Figure 5E:
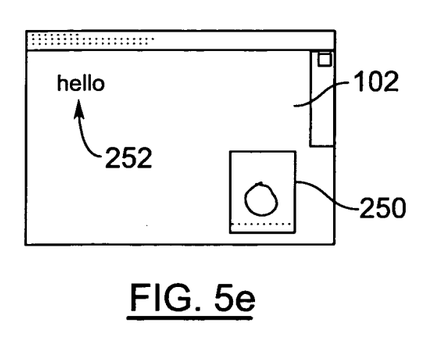

When the scaled desktop application is invoked, a scaled version of the entire image projected on the touch surface 102 is displayed within a small window 200 either adjacent the location of the input gesture or a suitable lower portion of the touch surface as shown in FIG. 4. In this example, the window 200 is approximately one square foot and is displayed adjacent the bottom edge of the touch surface 102 at a location that is easily accessed by the user. When a user wishes to interact with displayed image presented on the touch surface 102, the user simply needs to interact with the scaled version of the displayed image within the window 200. Touches and interactions with the scaled image in the window 200 are mapped to the larger image projected on the touch surface 102. In this manner, the user is only required to interact with the small area within the window 200 in order to interact with the entire area of the touch surface. The mapping of the window 200 to the touch surface is achieved via a rectangular coordinate transformation. Assuming the touch surface 102 has dimensions SW and SH and the window 200 is at TX and TY has dimensions TW and TH, coordinates X, Y within the window 200 can be mapped to touch surface coordinates as follows:

$$SX=(X-TX)/TW \times SW$$

$$SY=(Y-TY)/TH \times SH$$

As will be appreciated, the scaled desktop application facilitates user interaction with the entire touch surface 102 including regions of the touch surface 102 that typically are beyond the reach of the user.

Text Input

When the user is interacting with a designated writing area within the projected image, the user can invoke a text input application stored on the computer 110 to enable the user to place text in the designated writing area at hard to reach locations. In response to a user input command to invoke the text input application, a text box window 250 is opened and presented adjacent a lower bottom corner of the touch surface 102. The text box window 250 is linked to an upper text display region 252 adjacent the top edge of the touch surface 102. When a character is written into the text box window 250 and entered via a mouse command, the written character is recognized by the computer 110, injected into the text display region 252 and presented in the image displayed on the touch surface 102. FIGS. 5a to 5e show the text box window 250 with the characters "h", "e", "l", "l" and "o" injected into the upper text display region 252. The position of the text box window 250 can be manipulated by the user allowing the text box window 250 to be positioned at basically any desired location on the touch surface 102. Likewise, the text display region 252 linked to the text box window 250 can be manipulated by the user to allow it to be positioned at basically any desired location on the touch surface 102.

Intelligent Displayed Object Determination

The position of displayed objects such as toolbars, pop-up windows etc. on the touch surface 102 is important as not all areas of the touch surface are immediately accessible to the user. To help ensure displayed objects are displayed at convenient locations, a variety of methods for intelligently displaying objects can be employed by the touch system 100.

The various methods for intelligently displaying objects are based on user position relative to the touch surface 102. In this manner, as the user moves relative to the touch surface, so do the locations of displayed objects helping to ensure that displayed objects remain at conveniently accessible locations on the touch surface 102.

In one embodiment, when a displayed object is to be presented on the touch surface 102, the displayed object is presented at a location proximate to the last mouse event input via the touch surface 102 taking into account the position of the touch surface edges and other presented objects such as windows and toolbars. In this case, it is assumed that a user typically will not move great distances in between mouse interactions with the touch surface 102.

In another embodiment, the extended fields of view of the cameras C are utilized. Images captured by the cameras that are processed to detect pointer interactions with the touch surface 102 are also processed to locate the position of the user relative to the touch surface 102. The user's position as seen by the cameras is then used to position displayed objects so that the displayed objects are presented at a location proximate to the user. Using the extended fields of view of the cameras is however limited since it requires the user to remain within the fields of view of the cameras.

In yet another embodiment, an auxiliary stand-alone camera (not shown) or a projector with a built-in auxiliary camera that is positioned in front of or behind the touch surface 102 is used to capture images that are processed by the computer 110 to detect the position of the user relative to the touch surface 102. The auxiliary camera may be one used for purposes of video conferencing or security. The user's position as seen by the auxiliary camera is used to position displayed objects so that the displayed objects are presented at a location proximate to the user. This allows displayed objects to track movement of the user. If desired, images captured by the auxiliary camera can be further processed to detect shadows cast on the touch surface 102 and to present displayed objects on the touch surface 102 at locations proximate the user and outside of cast shadows.

Modal Box Display

Figure 6:
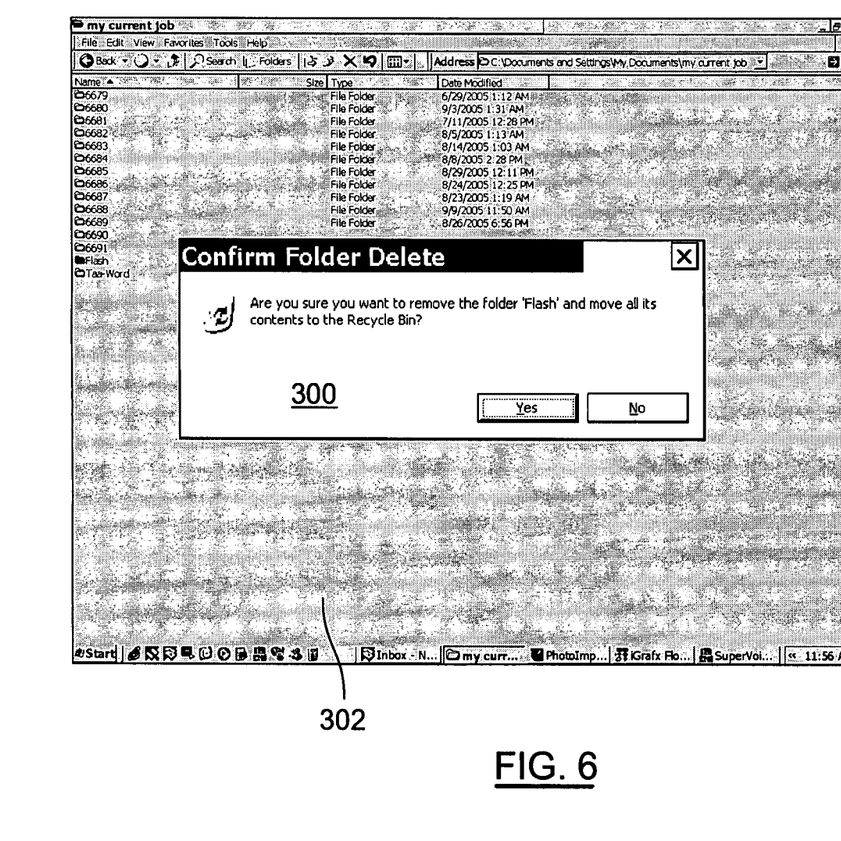
FIG. 6 is a front plan view of the touch surface showing a highlighted displayed modal box.

As the touch surface 102 is large, some displayed objects presented on the touch surface 102 may be difficult to detect visually. Depending on the nature of the displayed object, not being able to see the displayed object may create user frustration. For example, when a modal box is displayed, the user is inhibited from interacting with the application running on computer 110 until the modal box is answered. If the user is unaware of the existence of the modal box, frustration can arise as the user struggles with the application that has become unexpectedly disabled. To assist a user to visually identify modal boxes or the like, when a modal box 300 is presented on the touch surface 102, a dark overlay 302 is also presented on the touch surface 102 that has a hole cut in it corresponding in size and shape to the modal box as shown in FIG. 6. The overlay 302 may also include holes for sub-dialog boxes, tool-tips and other graphical information that may need to be visible to the user to enable the user to answer the modal box 300. The overlay 302 provides strong visual feedback to the user to ensure that the modal box 300 is easily identified on the touch surface 102.

Presentation of the modal box 300 on the touch surface 102 is detected by a listener application running on the computer 110. When the user answers with the modal box, the overlay 302 is immediately removed. If desired, when a modal box is to be presented on the touch surface 102, the modal box can be presented on the touch surface at a location adjacent the position of the user using one of the intelligent displayed object methods described above.

Alternatively, different visual feedback to highlight the modal box may be used. For example, the existence of a displayed modal box may be highlighted by presenting concentric circles of narrowing diameter around the modal box similar to a radar "ping".

Voice Recognition

If desired, the touch system 100 may make use of voice recognition to allow the user to use voice commands to interact with the touch surface 102. In this case, the computer 110 executes XP voice recognition software. A microphone (not shown) coupled to the computer 110 is also provided to pick-up user input voice commands. To simplify menu selection, voice command menus are provided that can be pulled down allowing the user to read the appropriate voice command to be entered. In this manner, files can be opened, closed and manipulated via voice input avoiding the need for the user to interact physically with the entire touch surface 102. Input voice commands can also be entered to control the projectors $P_1$ to $P_3$ or to change the nature of the tool (i.e. pen or eraser) being used to input touch commands.

In this embodiment, the voice recognition feature is enabled and disabled dynamically through a specified touch command to allow discussions in the vicinity of the touch system 100 to be carried out without inadvertently activating a voice command.

Intelligent Mouse

When using a mouse on a personal computer or the like, the mouse has a hover mode which allows the user to determine when the mouse is positioned over a target displayed object. This facilitates user interaction with displayed objects. Unfortunately in touch systems generally and especially in the large scale touch system 100, mouse position feedback is lost making it difficult for a user to determine when the mouse is positioned over a target displayed object.

To deal with this loss of feedback, the computer 110 can be conditioned to execute an intelligent mouse application. When a mouse down event is received, the location of the mouse down event is examined to determine if the mouse down event is proximate a viable target displayed object. In this example, a proximate viable target displayed object is one that is positioned within five (5) pixels of the mouse down event. If the mouse down event is proximate a viable target displayed object, the mouse down event is automatically moved to the position of the viable target displayed object and the displayed cursor is moved to the position of the target displayed object. Depending on the nature of the displayed object, the cursor may or may not be locked to the displayed object. For example, if the mouse event is adjacent a window border, the cursor is not locked to the window border as it is assumed that the mouse down event is to resize the window. When the position of the mouse moves beyond a threshold distance from the target displayed object, the mouse down event and cursor are released.

On Screen Control

The large scale touch system 100 can also be conditioned to invoke one or more of a number of on-screen control applications to facilitate user interaction with hard to reach areas of the touch surface 102. These on-screen control applications include an absolute mirror mode application, a relative mouse pad application and an on-screen mouse application.

Figure 7:
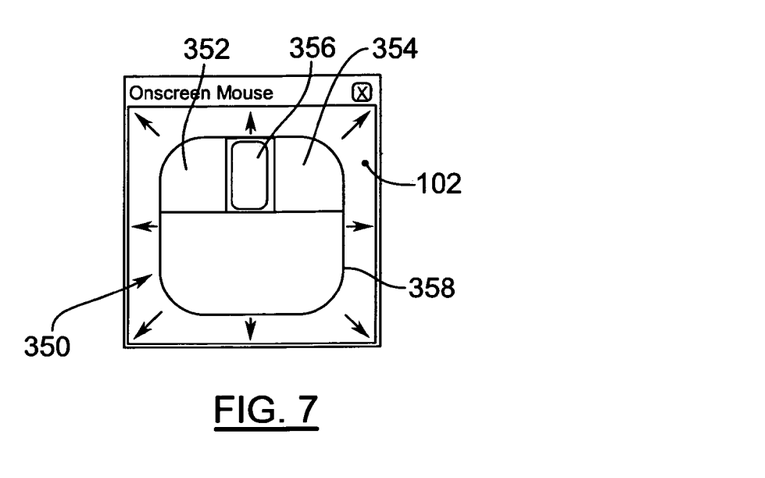
FIG. 7 is a front plan view of the touch surface showing a mouse object displayed during execution of an on-screen mouse application.

When the on-screen mouse application is invoked, a mouse object 350 is presented adjacent the bottom of the touch surface 102 as shown in FIG. 7. The mouse object 350 is similar to a standard mouse and has right, left and center buttons 352 to 356 respectively. When a pointer contact on the body 358 of the mouse object 350 is made, the mouse object can be moved by dragging the pointer across the touch surface 102 resulting in corresponding movement of the cursor across the touch surface. This allows the user to position the cursor at any desired location on the touch surface 102. When a pointer contact is made with on the right, left or center button, right click, left click or center click mouse events based on the cursor position relative to the touch surface 102 are generated.

If the user drags the mouse object 350 to a border of the displayed image and contact between the pointer and the mouse object is lost, the mouse object 350 is automatically re-centered mimicking the re-centering behaviour of a conventional mouse pad. If a drag operation is being performed as a result of a left click operation and the automatic re-centering takes place, the left click operation remains locked when the mouse object 350 is re-centered allowing the drag operation to be continued. If the user performs a click operation and drags the mouse object using the pointer, the mouse object 350 remains stationary and the cursor moves within the boundary of the mouse object tracking the pointer movement.

To avoid contact with the displayed mouse object 350 affecting the mouse of the computer operating system and interfering with operating system window input focus, mouse events resulting from pointer interactions with the mouse object are injected into the operating system mouse queue thereby to inhibit input focus from shifting to the mouse object. This is achieved in a manner similar to that described in U.S. Pat. No. 6,741,267 to Van leperen, assigned to SMART Technologies Inc., assignee of the present invention, the content of which is incorporated herein by reference.

Figure 8A:
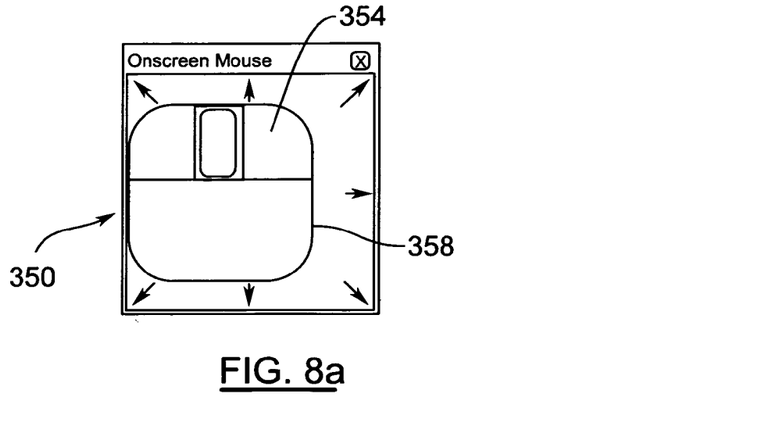
FIGS. 8a to 8c are additional front plan views of the touch surface showing the mouse object.
Figure 8B:
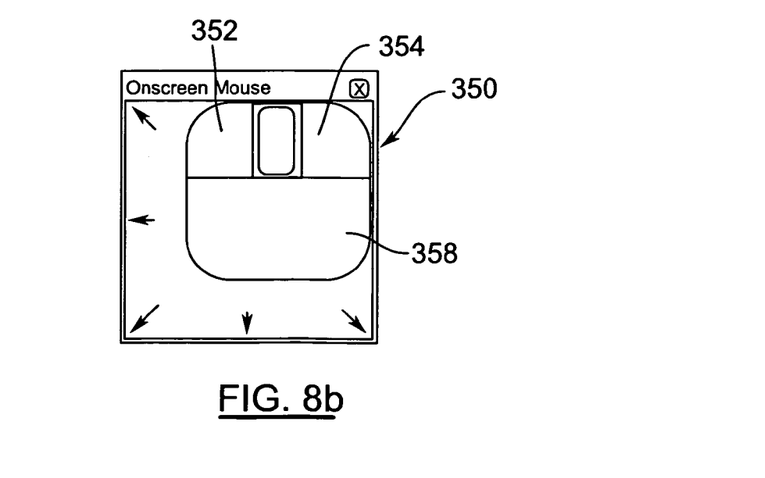
Figure 8C:
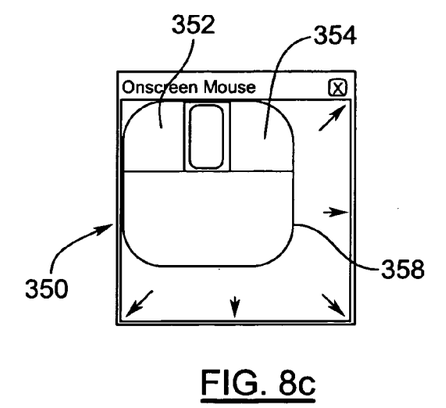

For example, FIG. 8a shows the mouse object 350 where a pointer contact has been made on the body 358 of the mouse object and the pointer has been dragged to the left resulting in the mouse object 350 moving across the touch surface 102 to the left. FIG. 8b shows the mouse object 350 where a pointer contact has been made on the body 358 of the mouse object and the pointer has been dragged to the right and up resulting in the mouse object 350 moving across the touch surface 102 to the right and up. FIG. 8c shows the mouse object 350 where a pointer contact has been made on the left button 352 and the pointer has been dragged up and to the left resulting in a drag operation to the left and up.

Figure 9A:
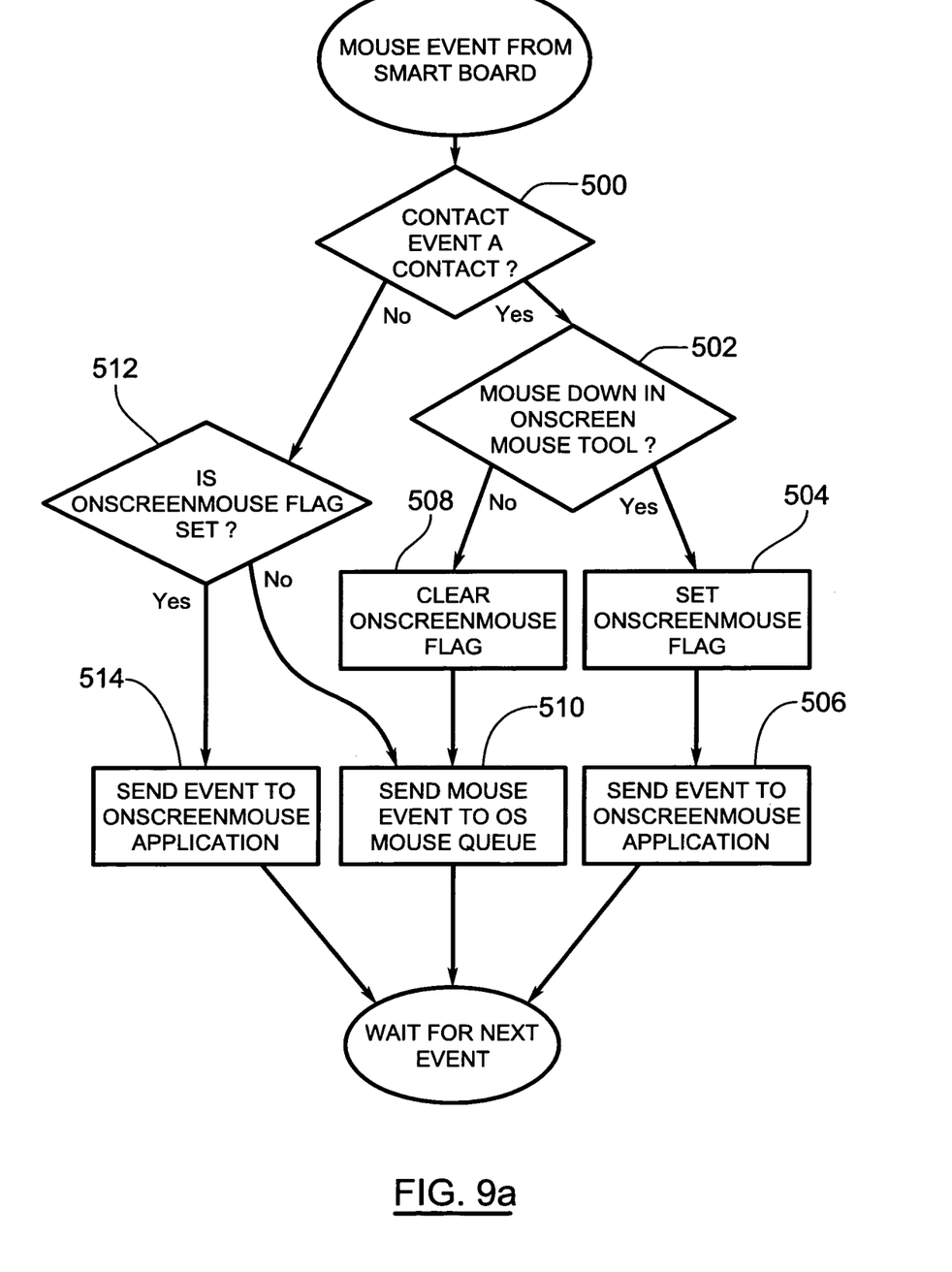
FIGS. 9a and 9b are flowcharts showing the steps performed during handling of mouse events during execution of the on-screen mouse application.
Figure 9B:
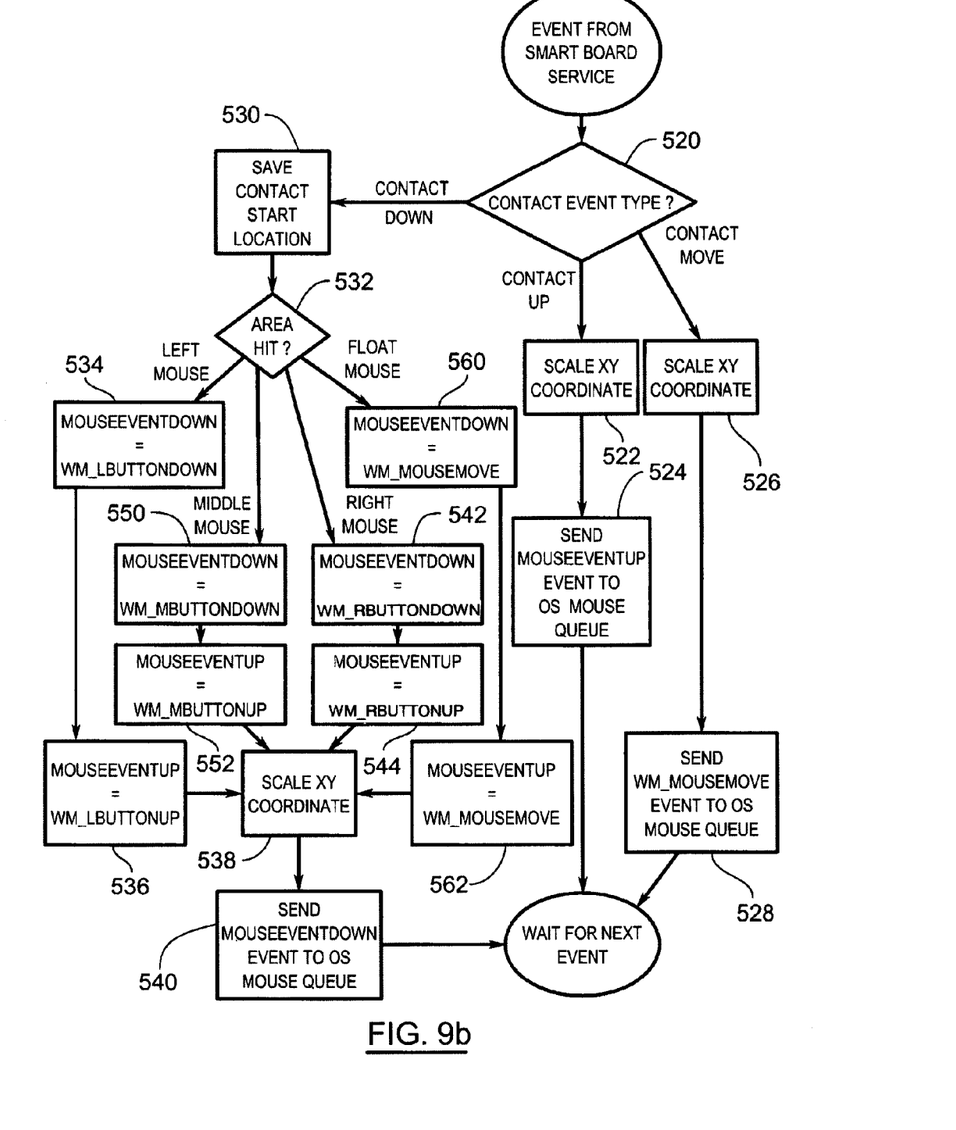

FIGS. 9a and 9b are flowcharts showing the manner by which mouse object events are handled. When a pointer contact is made on the touch surface 102, a check is made to determine whether the pointer contact occurs within the mouse object (step 500). If so, the mouse object is examined to determine if it is in a mouse down condition (step 502). If so, a mouse flag is set (step 504) and the contact event is sent to the on-screen mouse application to enable the mouse contact to be processed (step 506) as will be described. If the mouse object is not in a mouse down condition, the mouse flag is cleared (step 508) and the mouse event is sent to the operating system mouse queue (step 510).

At step 500, if the contact event occurs outside of the mouse object, a check is made to determine if the mouse flag is set (step 512). If not, the mouse event is sent to the operating system mouse queue (step 510). If the mouse flag is set, the contact event is sent to the on-screen mouse application for processing (step 514).

When a contact event is sent to the on-screen mouse application, the contact event is examined to determine its type (step 520). If the contact event is a contact up event, the x,y coordinates of the contact up event location are scaled (step 522) and the contact up event is sent to the operating system mouse queue (step 524).

If the contact event is a mouse move event, the x,y coordinates of the mouse move are scaled (step 526) and the mouse move event is sent to the operating system mouse queue (step 528).

If the contact event is a mouse down event, the location of the pointer contact is saved (step 530) and the area of the mouse object on which the pointer contact is made is examined (step 532). If the left button is contacted, left button down and left button up events are generated (steps 534 and 536). The x,y coordinates of the pointer contact are then scaled (step 538) and the left click mouse events are sent to the operating system mouse queue (step 540). If the right button is contacted, right button down and right button up events are generated (steps 542 and 544). The x,y coordinates of the pointer contact are then scaled (step 538) and the right click mouse events are sent to the operating system mouse queue (step 540). If the middle mouse button is contacted, middle button down and middle button up events are generated (steps 550 and 552). The x,y coordinates of the pointer contact are then scaled (step 538) and the middle click mouse events are sent to the operating system mouse queue (step 540). If the mouse body is contacted, mouse move events are generated (steps 560 and 562). The x,y coordinates of the pointer contact are then scaled (step 538) and the mouse move event is sent to the operating system mouse queue (step 540).

Figure 10:
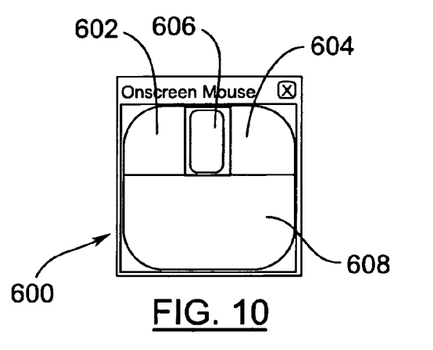
FIG. 10 is a front plan view of the touch surface showing a relative mouse pad object displayed during execution of a relative mouse pad application.
Figure 11A:
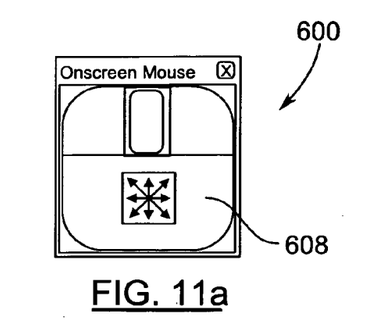
FIGS. 11a and 11b are additional front plan views of the relative mouse pad.
Figure 11B:
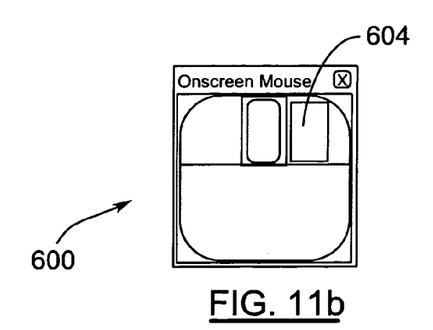

When the relative mouse pad application in invoked, a mouse pad object 600 is presented adjacent the bottom of the touch surface 102 as shown in FIG. 10. The mouse pad object 600 is similar to the mouse pad on a laptop computer and includes a left button 602, a right button 604 and, a center button 606 a stroke input area 608. When a user strokes the input area 608 with a pointer, the pointer movement is used to move the cursor across the touch surface 102. When a pointer contact is made on either the right, left or center button, right click, left click and center click mouse events based on the cursor position relative to the touch surface are generated. The mouse events are handled in a manner similar to that described above with reference to the on-screen mouse application. For example, FIG. 11a shows the mouse pad object 600 where a pointer contact is made on the input area 608 and the pointer is dragged across the input area. This results in the cursor moving across the touch surface 102 in the direction of pointer movement. The further the pointer is dragged, the faster the cursor is moved. FIG. 11b shows the mouse pad object 600 where a pointer contact has been made on the right button 604.

The absolute mirror mode application is invoked in response to actuation of a toggle button displayed at the bottom corner of the touch surface 102. When the toggle button is actuated and the absolute mirror mode is invoked, the portion of the displayed image adjacent the top edge of the touch surface 102 is reproduced and mirrored adjacent the bottom edge of the touch surface 102. The reproduced portion of the displayed image is mapped to its corresponding portion of the displayed image using a rectangular coordinate transformation. When the user contacts the touch surface in the reproduced portion of the displayed image, the contact is mapped to its corresponding portion of the touch surface 102 allowing the user to interact easily with the top portion of the touch surface. If the displayed image is updated in response to the user contact, updates occurring in the top portion of the displayed image are redrawn in the reproduced portion of the displayed image appearing adjacent the bottom of the touch surface. If opposite sides of the touch surface 102 display different user interactable objects, the sides of the touch surface can be mirrored.

A number of tools are described above to facilitate user interaction with a large scale touch system. Those of skill in the art will appreciate that the large scale interactive touch system may include any one or various combinations of the above described interactive tools.

Although embodiments have been described with reference to the figures, those of skill in the art will also appreciate that variations and modifications may be made without departing from the spirit and scope thereof as defined by the appended claims.

What is claimed is:

1. A method of facilitating user interaction with an image presented on a touch surface of a large scale touch system, said touch surface comprising a plurality of generally rectangular sub-regions arranged in a row extending the longitudinal length of the touch surface with adjacent sub-regions partially overlapping, said method comprising:

capturing images of the sub-regions of the touch surface with sets of camera devices, each set of camera devices comprising at least one pair of laterally spaced camera devices having overlapping fields of view oriented to look generally across the respective sub-region of said touch surface;

processing the captured images to detect pointer movement within each sub-region and generating pointer coordinate data for each sub-region in which pointer movement is detected;

processing pointer coordinate data generated for adjacent sub-regions that are a result of pointer movement within overlapping portions thereof in accordance with weighted averaging logic to yield a single set of pointer coordinate data representing the pointer movement within the overlapping portions;

processing the pointer coordinate data to detect a predetermined input gesture made at an arbitrary location on said touch surface;

displaying on the touch surface a scaled version of at least a portion of said displayed image at a user accessible location in response to detection of said predetermined input gesture, said user accessible location positioned adjacent to said arbitrary location on said touch surface;

processing the pointer coordinate data to detect user interaction with said touch surface within said displayed scaled version of at least a portion of said displayed image;

calculating a mapped position on the touch surface based on the position of said user interaction and the position of said displayed scaled version; and mapping said user interaction to said mapped position on the touch surface so that user interactions with the displayed scaled version are translated to interactions with said displayed image.

2. The method of claim 1 wherein during displaying, a scaled version of the entire displayed image is presented within a window.

3. The method of claim 2 wherein said window is positioned adjacent a lower portion of said touch surface.

4. A method of facilitating user interaction with an image presented on a touch surface of a large scale touch system, said touch surface comprising a plurality of generally rectangular sub-regions arranged in a row extending the longitudinal length of the touch surface with adjacent sub-regions partially overlapping, said method comprising:

capturing images of the sub-regions of the touch surface with sets of camera devices, each set of camera devices comprising at least one pair of laterally spaced camera devices having overlapping fields of view oriented to look generally across the respective sub-region of said touch surface;

processing the captured images to detect pointer movement within each sub-region and generating pointer coordinate data for each sub-region in which pointer movement is detected;

processing pointer coordinate data generated for adjacent sub-regions that are a result of pointer movement within overlapping portions thereof in accordance with weighted averaging logic to yield a single set of pointer coordinate data representing the pointer movement within the overlapping portions;

receiving a user command designating a text display region for displaying text on the touch surface;

displaying a textbox window on said touch surface adjacent a user accessible location in response to an associated input command;

processing the pointer coordinate data to detect writing input within said textbox window, the position of said writing input being irrelevant to the position of said text display region;

injecting the detected writing input as text in said text display region; and processing the pointer coordinate data to detect a predefined pointer interaction with said touch surface and in response changing the position of at least one of the textbox window and the text display region on the touch surface.

5. The method of claim 4 wherein said text display region is initially positioned adjacent an upper portion of said touch surface.

6. The method of claim 5 wherein said textbox window is initially positioned adjacent a lower portion of said touch surface.

7. A method of facilitating user interaction with an image presented on a touch surface of a large scale touch system, said touch surface comprising a plurality of generally rectangular sub-regions arranged in a row extending the longitudinal length of the touch surface with adjacent sub-regions partially overlapping, said method comprising:

capturing images of the sub-regions of the touch surface with sets of camera devices, each set of camera devices comprising at least one pair of laterally spaced camera devices having overlapping fields of view oriented to look generally across the respective sub-region of said touch surface;

processing the captured images to detect pointer movement within each sub-region and generating pointer coordinate data for each sub-region in which pointer movement is detected;

processing pointer coordinate data generated for adjacent sub-regions that are a result of pointer movement within overlapping portions thereof in accordance with weighted averaging logic to yield a single set of pointer coordinate data representing the pointer movement within the overlapping portions;

processing the pointer coordinate data to detect a predetermined input gesture made at an arbitrary location on said touch surface and in response duplicating a portion of said displayed image on said touch surface at a user accessible location; and mapping pointer coordinate data generated in response to user interaction with said touch surface within said duplicated portion of said displayed image to a corresponding position on said touch surface so that user interactions with the duplicated portion are translated to interactions with the corresponding portion of said displayed image.

8. The method of claim 7 wherein said duplicated portion is the upper region of said displayed image.

9. The method of claim 8 wherein said upper region of said displayed image is duplicated adjacent the bottom portion of said displayed image.

10. The method of claim 9 wherein each side portion of said displayed image is duplicated adjacent the opposite side of said touch surface.

11. A method of facilitating user interaction with an image presented on a touch surface of a large scale touch system, said touch surface comprising a plurality of generally rectangular sub-regions arranged in a row extending the longitudinal length of the touch surface with adjacent sub-regions partially overlapping, said method comprising:

capturing images of the sub-regions of the touch surface with sets of camera devices, each set of camera devices comprising at least one pair of laterally spaced camera devices having overlapping fields of view oriented to look generally across the respective sub-region of said touch surface;

processing the captured images to detect pointer movement within each sub-region and generating pointer coordinate data for each sub-region in which pointer movement is detected;

processing pointer coordinate data generated for adjacent sub-regions that are a result of pointer movement within overlapping portions thereof in accordance with weighted averaging logic to yield a single set of pointer coordinate data representing the pointer movement within the overlapping portions;

displaying a mouse object on said touch surface at a user accessible location and remote from a cursor displayed on said touch surface, wherein said mouse object comprises a first area, and wherein pointer interaction within said first area determines the movement of said cursor;

processing the pointer coordinate data to detect pointer interactions on said first area of said mouse object;

positioning said mouse object on said touch surface based on detected pointer interactions on said first area;

positioning the cursor on said touch surface based on detected pointer interactions on said first area; and processing events corresponding to said detected pointer interactions in a manner to avoid input focus being shifted to said mouse object.

12. The method of claim 11 wherein said processing comprises injecting mouse events into a mouse event queue of the touch system operating system.

13. The method of claim 12 wherein said mouse object includes at least one second area, wherein user interaction within said second area causes a mouse-down event.

14. The method of claim 13 wherein said mouse object is moveable across said touch surface in response to pointer interactions with said touch surface.

15. The method of claim 11 further comprising:
automatically positioning said mouse object to a predefined location when said mouse object is at a predefined border.

16. The method of claim 11 further comprising:
saving said pointer coordinate data when said pointer interaction is a predefined type of pointer interaction;

automatically positioning said mouse object to a predefined location when said mouse object is at a predefined border; and resuming said saved pointer interaction.

17. A method of facilitating user interaction with an image presented on a display surface comprising a plurality of generally rectangular sub-regions arranged in a row extending the longitudinal length of said display surface with adjacent sub-regions partially overlapping, said method comprising:

capturing images of the sub-regions of the display surface with sets of camera devices, each set of camera devices being associated with a respective one of said sub-regions and comprising at least one pair of laterally spaced camera devices having overlapping fields of view oriented to look generally across the respective sub-region of said display surface;

processing the captured images to detect pointer movement within each sub-region and generating pointer coordinate data for each sub-region in which pointer movement is detected;

processing pointer coordinate data generated for adjacent sub-regions that are a result of pointer movement within overlapping portions thereof in accordance with weighted averaging logic to yield a single set of pointer coordinate data representing the pointer movement within the overlapping portions;

detecting at least one graphical object in said presented image associated with a running computer program, wherein user interaction with said image is required to dismiss said graphic object in order for the running computer program to advance beyond its current state;

applying a dark overlay to said display surface, said overlay having an opening therein determined at least by the position, size and shape of said at least one graphical object;

processing pointer coordinate data to detect user interaction with said image signifying the dismissal of said graphical object; and removing said overlay.

18. The method of claim 17 wherein said at least one displayed graphical object is a modal box.

19. The method of claim 17 further comprising:

displaying concentric rings about said modal box.

* * * * *